No. 616,342. Patented Dec. 20, 1898.
H. D. MILLS.
BICYCLE BRAKE.
(Application filed June 24, 1897.)

(No Model.)

WITNESSES:
Arthur Ashley
Victor J. Evans

INVENTOR
H. D. Mills
BY
John Wedderburn.
ATTORNEY.

UNITED STATES PATENT OFFICE.

HENRY DELANEY MILLS, OF FISH'S EDDY, NEW YORK.

BICYCLE-BRAKE.

SPECIFICATION forming part of Letters Patent No. 616,342, dated December 20, 1898.

Application filed June 24, 1897. Serial No. 642,160. (No model.)

*To all whom it may concern:*

Be it known that I, HENRY DELANEY MILLS, of Fish's Eddy, in the county of Delaware and State of New York, have invented certain new and useful Improvements in Brakes; and I do hereby declare the following to be a full, clear, and exact description of the invention, such as will enable others skilled in the art to which it appertains to make and use the same.

The object of my invention is to provide a brake for bicycles and other light vehicles which may be applied to the side edges of the wheel, and thereby avoid the cutting or abrasion of the tire along its tread-surface.

The invention consists of a guide-frame secured to the head-tube of a bicycle, having downwardly-extending diverging arms provided with grooves or slots, a brake-frame slidingly mounted with respect to said guide-frame, having downwardly-extending diverging arms provided with lugs or projections adapted to fit and move within the grooves in said guide-frame and with inwardly-extending flanges at their lower ends, and brake shoes or rollers mounted in the head and in the flanges on said brake-frame and lying substantially parallel to the side arms thereof.

The invention is clearly illustrated in the accompanying drawings, in which—

Figure 1:
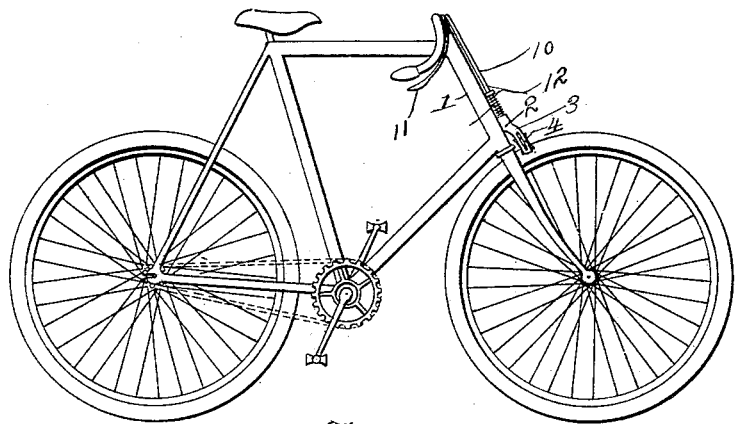
Figure 2:
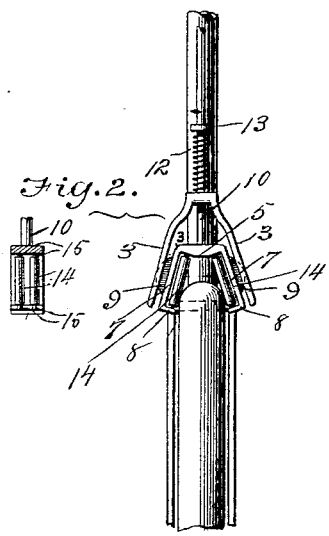

Figure 1 represents a side elevation of a bicycle with my improved brake applied. Fig. 2 is a detail front elevation of the brake mechanism.

Like reference-numerals indicate like parts in both views.

To the head-tube 1 of a bicycle is secured the yoke-shaped guide-frame 2, the arms 3 3 of which extend downwardly and outwardly from its head and are provided with grooves or slots 4 4 for a purpose which will hereinafter appear. Located within the arms 3 of the guide-frame is a brake-frame 5, comprising a head 6, having angularly-arranged lower sides, downwardly-extending and outwardly-diverging arms 7 7, inwardly-extending flanges 8 upon the lower ends of said arms, and outwardly-extending lugs or projections 9 9 on said arms, which are adapted to fit and move within the grooves or slots 4 in the guide-frame 2. A rod or pitman 10 is connected to the head 6 of the brake-frame, extends through an opening in the head of the guide-frame, and is pivotally attached at its upper end to a brake-operating lever 11 on the handle-bar of the bicycle. Surrounding the rod or pitman 10 is a coil-spring 12, which engages the upper side of the guide-frame 2, and an abutment 13 on the rod or pitman 10, the said spring serving to normally hold the brake-frame in its raised position.

Carried by the brake-frame are rollers 14 14, which constitute the brake-shoes and are located substantially parallel to the side arms 7 7 of said frame. The said rollers have pintles 15 15 upon their upper and lower ends, respectively, which fit within suitable sockets in the head 6, and flanges 8, providing bearings upon which the rollers turn. By this construction it will be seen that the rollers 14 are located at an angle one to the other, with their lower ends diverging, so that upon the operation of the brake-operating lever 11, which forces downwardly the brake-frame 5, said brake shoes or rollers will be brought into contact with the rim of the wheel upon opposite sides thereof.

Having now described the invention, what I claim as new, and desire to secure by Letters Patent, is—

1. In a vehicle-brake, the combination with a stationary guide-frame, having grooves or slots in the side arms thereof, of a slidingly-mounted brake-frame having arms thereon, flanges upon the ends of said arms, lugs or projections on said arms adapted to fit within said grooves or slots, and angularly-arranged brake-rollers mounted in said brake-frame, and having bearing in said flanges.

2. In a bicycle-brake, the combination with a guide-frame secured to the head-tube of the bicycle and comprising a head and downwardly-extending diverging arms provided with grooves or slots, of a brake-frame comprising a head, having angularly-disposed lower sides, downwardly and outwardly diverging arms on said head, inwardly-extending flanges on said arms, and lugs or projections adapted to fit and move within said grooves or slots, angularly-arranged brake-rollers in said brake-frame having bearings in the head of said frame and in the flanges on the side arms thereof, an operating-lever for the brake, a rod or pitman connecting the brake-frame with said lever, a stop or abutment thereon, and a spring engaging said stop or abutment and said guide-frame as and for the purpose set forth.

In testimony whereof I have signed this specification in the presence of two subscribing witnesses.

H. DELANEY MILLS.

Witnesses:
F. R. BURS,
MELVIN FISH.